US012647307B2

(12) United States Patent
Hu et al.

(10) Patent No.: US 12,647,307 B2
(45) Date of Patent: Jun. 2, 2026

(54) PREAMBLE DESIGNS FOR NEXT-GENERATION WLAN IN 60GHZ BAND

(71) Applicant: MediaTek Inc., Hsinchu City (TW)

(72) Inventors: Shengquan Hu, San Jose, CA (US); Jianhan Liu, San Jose, CA (US); Thomas Edward Pare, Jr., San Jose, CA (US)

(73) Assignee: MediaTek Inc., Hsinchu City (TW)

( * ) Notice: Subject to any disclaimer, the term of this patent is extended or adjusted under 35 U.S.C. 154(b) by 0 days.

(21) Appl. No.: 18/127,680

(22) Filed: Mar. 29, 2023

(65) Prior Publication Data

US 2023/0318891 A1     Oct. 5, 2023

Related U.S. Application Data

(60) Provisional application No. 63/325,168, filed on Mar. 30, 2022.

(51) Int. Cl.
H04L 27/26 (2006.01)

(52) U.S. Cl.
CPC ...... H04L 27/2603 (2021.01); H04L 27/2613 (2013.01)

(58) Field of Classification Search
None
See application file for complete search history.

(56) References Cited

U.S. PATENT DOCUMENTS

| | | | |
|---|---|---|---|
| 2017/0202011 A1* | 7/2017 | Trainin | H04W 52/0216 |
| 2020/0112469 A1* | 4/2020 | Sakamoto | H04L 5/0044 |
| 2020/0221341 A1 | 7/2020 | Huang et al. | |
| 2020/0228380 A1* | 7/2020 | Yang | H04L 5/0039 |
| 2021/0045117 A1 | 2/2021 | Chen et al. | |
| 2021/0336827 A1 | 10/2021 | Park et al. | |
| 2021/0392661 A1 | 12/2021 | Cao et al. | |
| 2022/0045889 A1* | 2/2022 | Yu | H04W 72/0453 |
| 2022/0070710 A1* | 3/2022 | Lim | H04W 72/04 |
| 2022/0070927 A1* | 3/2022 | Lim | H04W 24/10 |
| 2024/0022934 A1* | 1/2024 | Lim | H04W 4/029 |

(Continued)

FOREIGN PATENT DOCUMENTS

EP         3496440 B1     4/2021

OTHER PUBLICATIONS

Taiwan Intellectual Property Office, Office Action in Taiwan Patent Application No. 112112245, Aug. 31, 2023.

(Continued)

*Primary Examiner* — Otis L Thompson, Jr.
(74) *Attorney, Agent, or Firm* — Andy M. Han; Han IP PLLC

(57) ABSTRACT
Techniques pertaining to preamble designs for next-generation wireless local area networks (WLANs) in 60 GHz band are described. A first apparatus communicates in a 60 GHz band wirelessly with a second apparatus by transmitting a first physical-layer protocol data unit (PPDU) to the second apparatus and/or receiving a second PPDU from the second apparatus. Each of the first PPDU and the second PPDU and a respective preamble thereof are either with or without at least partial backward compatibility with one or more pre-existing PPDU formats and preambles.

20 Claims, 9 Drawing Sheets

900

COMMUNICATE, BY A PROCESSOR OF A FIRST APPARATUS, IN A 60GHZ BAND WIRELESSLY WITH A SECOND APPARATUS

● EACH OF THE FIRST PPDU AND THE SECOND PPDU AND A RESPECTIVE PREAMBLE THEREOF ARE EITHER WITH OR WITHOUT AT LEAST PARTIAL BACKWARD COMPATIBILITY WITH ONE OR MORE PREEXISTING PPDU FORMATS AND PREAMBLES

910

TRANSMIT A FIRST PHYSICAL-LAYER PROTOCOL DATA UNIT (PPDU) TO THE SECOND APPARATUS

912

RECEIVE A SECOND PPDU FROM THE SECOND APPARATUS

914

(56) References Cited

U.S. PATENT DOCUMENTS

| 2024/0049135 A1* | 2/2024 | Lim | ...................... | G01S 5/0268 |
| 2024/0064804 A1* | 2/2024 | Lim | ...................... | G01S 13/003 |

OTHER PUBLICATIONS

European Patent Office, Extended European Search Report in European Patent Application No. 23165394.0, Aug. 23, 2023.
China National Intellectual Property Administration, 1st Office Action in China Patent Application No. 202310329519.3, Apr. 22, 2026.

* cited by examiner

100

STA
120

WIRELESS COMMUNICATIONS WITH PREAMBLE DESIGNS FOR A NEXT-
GENERATION WIRELESS LOCAL AREA NETWORK (WLAN) IN 60GHz BAND

STA
110

200

| L-STF | L-CEF | L-Header | U-SIG | EHT-SIG | EHT-STF | EHT-LTF | Data | TRN |
|-------|-------|----------|-------|---------|---------|---------|------|-----|

Figure 3:
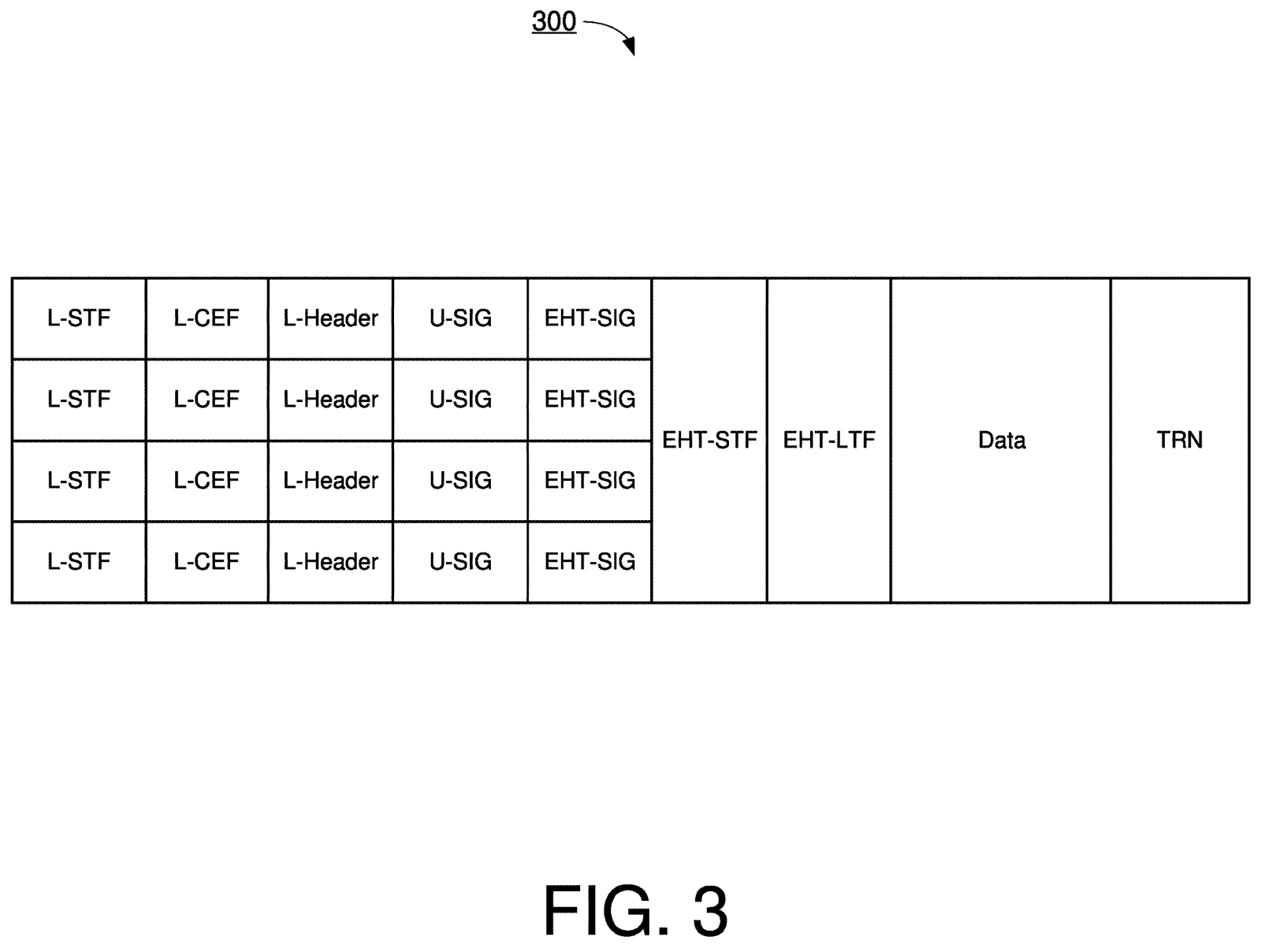

| L-STF | L-CEF | L-Header | U-SIG | EHT-SIG | | | |
|---|---|---|---|---|---|---|---|
| L-STF | L-CEF | L-Header | U-SIG | EHT-SIG | EHT-STF | EHT-LTF | Data | TRN |
| L-STF | L-CEF | L-Header | U-SIG | EHT-SIG | | | |
| L-STF | L-CEF | L-Header | U-SIG | EHT-SIG | | | |

| L-STF | L-CEF | L-Header | U-SIG | EHT-SIG | EHT-STF | EHT-LTF | Data | TRN |
|-------|-------|----------|-------|---------|---------|---------|------|-----|
|       |       |          | U-SIG | EHT-SIG |         |         |      |     |
|       |       |          | U-SIG | EHT-SIG |         |         |      |     |
|       |       |          | U-SIG | EHT-SIG |         |         |      |     |

(B)

| L-STF | L-CEF | L-Header | U-SIG | EHT-SIG | EHT-STF | EHT-LTF | Data | TRN |
|-------|-------|----------|-------|---------|---------|---------|------|-----|
|       |       |          | U-SIG | EHT-SIG |         |         |      |     |

HT-mixed

HT-greenfield (B)

VHT

900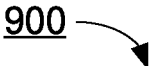

COMMUNICATE, BY A PROCESSOR OF A FIRST APPARATUS, IN A 60GHZ BAND WIRELESSLY WITH A SECOND APPARATUS

- EACH OF THE FIRST PPDU AND THE SECOND PPDU AND A RESPECTIVE PREAMBLE THEREOF ARE EITHER WITH OR WITHOUT AT LEAST PARTIAL BACKWARD COMPATIBILITY WITH ONE OR MORE PREEXISTING PPDU FORMATS AND PREAMBLES

910

TRANSMIT A FIRST PHYSICAL-LAYER PROTOCOL DATA UNIT (PPDU) TO THE SECOND APPARATUS

912

RECEIVE A SECOND PPDU FROM THE SECOND APPARATUS

PREAMBLE DESIGNS FOR NEXT-GENERATION WLAN IN 60GHZ BAND

CROSS REFERENCE TO RELATED PATENT APPLICATION

The present disclosure is part of a non-provisional patent application claiming the priority benefit of U.S. Provisional Patent Application No. 63/325,168, filed 30 Mar. 2022, the content of which herein being incorporated by reference in its entirety.

TECHNICAL FIELD

The present disclosure is generally related to wireless communications and, more particularly, to preamble designs for next-generation wireless local area networks (WLANs) in 60 GHz band.

BACKGROUND

Unless otherwise indicated herein, approaches described in this section are not prior art to the claims listed below and are not admitted as prior art by inclusion in this section.

In wireless communications such as Wi-Fi (or WiFi), the 60 GHz band has been used and standardized in Institute of Electrical and Electronics Engineers (IEEE) 802.11ad/ay directional multi-gigabit (DMG) and enhanced directional multi-gigabit (EDMG) systems to achieve higher throughput by utilizing the wide bandwidth of 60 GHz. On the other hand, metaverse type of applications, such as augmented reality (AR) and virtual reality (VR) applications and the like, typically require a high data rate with low latency. To meet the high data rate and low latency requirements for emerging metaverse type of applications, the 60 GHz millimeter wave (mmWave) band has been considered as one of potential technologies for next-generation wireless connectivity (e.g., Wi-Fi 8 and beyond). The preamble in an IEEE 802.11ad DMG system includes a short training field (STF), a channel estimation field (CEF) and a header, which are used for packet detection, automatic gain control (AGC), synchronization and channel estimation, and so on. IEEE 802.11ay keeps the non-EDMG portion backward compatible to IEEE 802.11ad (e.g., legacy STF (L-STF), legacy CEF (L-CEF) and legacy header (L-Header) field are the same as those under IEEE 802.11ad) and only with a single carrier (SC) mode. In that regard, designs of preamble for the next-generation WLANs in the 60 GHz band remain to be defined at the present time. Therefore, there is a need for a solution of preamble designs for next-generation WLANs in the 60 GHz band.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to preamble designs for next-generation WLANs in the 60 GHz band. Under various proposed schemes in accordance with the present disclosure, preambles in physical-layer protocol data unit (PPDU)s transmitted in next-generation WLANs in the 60 GHz band may or may not be at least partially backward compatible with preexisting IEEE 802.11 standards (e.g., IEEE 802.11ad and/or IEEE 802.11ay).

In one aspect, a method may involve a processor of a first apparatus communicating in a 60 GHz band wirelessly with a second apparatus by either or both: (a) transmitting a first PPDU to the second apparatus; and (b) receiving a second PPDU from the second apparatus. Each of the first PPDU and the second PPDU and a respective preamble thereof may be either with or without at least partial backward compatibility with one or more preexisting PPDU formats and preambles.

In another aspect, an apparatus may include a transceiver configured to communicate wirelessly and a processor coupled to the transceiver. The processor may communicate, via the transceiver, in a 60 GHz band wirelessly with one other apparatus by either or both: (a) transmitting a first PPDU to the second apparatus; and (b) receiving a second PPDU from the second apparatus. Each of the first PPDU and the second PPDU and a respective preamble thereof may be either with or without at least partial backward compatibility with one or more preexisting PPDU formats and preambles.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, 5th Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 2 is a diagram of an example design under a proposed scheme in accordance with the present disclosure.

FIG. 3 is a diagram of an example design under a proposed scheme in accordance with the present disclosure.

FIG. 4 is a diagram of example designs under a proposed scheme in accordance with the present disclosure.

FIG. 9 is a flowchart of an example process in accordance with an implementation of the present disclosure.

DETAILED DESCRIPTION OF PREFERRED EMBODIMENTS

Figure 1:
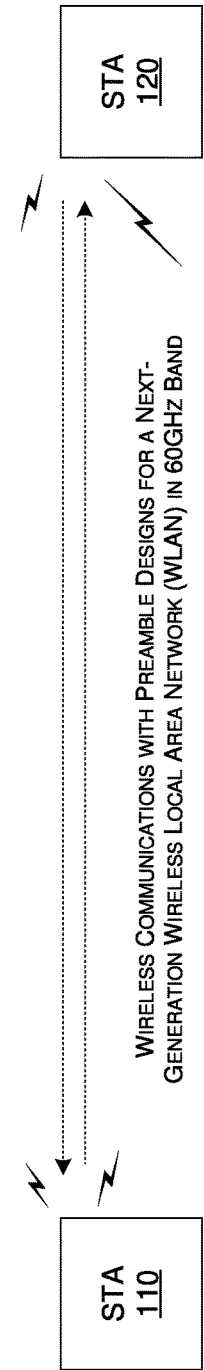
FIG. 1 is a diagram of an example network environment in which various solutions and schemes in accordance with the present disclosure may be implemented.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to preamble designs for next-generation WLANs in the 60 GHz band. According to the present disclosure, a number of possible solutions may be implemented separately or jointly. That is, although these possible solutions may be described below separately, two or more of these possible solutions may be implemented in one combination or another.

It is noteworthy that, in the present disclosure, a regular RU (rRU) refers to a RU with tones that are continuous (e.g., adjacent to one another) and not interleaved, interlaced or otherwise distributed. Moreover, a 26-tone regular RU may be interchangeably denoted as RU26 (or rRU26), a 52-tone regular RU may be interchangeably denoted as RU52 (or rRU52), a 106-tone regular RU may be interchangeably denoted as RU106 (or rRU106), a 242-tone regular RU may be interchangeably denoted as RU242 (or rRU242), and so on. Moreover, an aggregate (26+52)-tone regular multi-RU (MRU) may be interchangeably denoted as MRU78 (or rMRU78), an aggregate (26+106)-tone regular MRU may be interchangeably denoted as MRU132 (or rMRU132), and so on.

Since the above examples are merely illustrative examples and not an exhaustive listing of all possibilities, the same applies to regular RUs, distributed-tone RUs, MRUs, and distributed-tone MRUs of different sizes (or different number of tones). It is also noteworthy that, in the present disclosure, a bandwidth of 20 MHz may be interchangeably denoted as BW20 or BW20M, a bandwidth of 40 MHz may be interchangeably denoted as BW40 or BW40M, a bandwidth of 80 MHz may be interchangeably denoted as BW80 or BW80M, a bandwidth of 160 MHz may be interchangeably denoted as BW160 or BW160M, a bandwidth of 240 MHz may be interchangeably denoted as BW240 or BW240M, a bandwidth of 320 MHz may be interchangeably denoted as BW320 or BW320M, a bandwidth of 480 MHz may be interchangeably denoted as BW480 or BW480M, a bandwidth of 640 MHz may be interchangeably denoted as BW640 or BW640M, a bandwidth of 960 MHz may be interchangeably denoted as BW960 or BW960M, a bandwidth of 1280 MHz may be interchangeably denoted as BW1280 or BW1280M, and a bandwidth of 2560 MHz may be interchangeably denoted as BW2560 or BW2560M.

FIG. 1 illustrates an example network environment 100 in which various solutions and schemes in accordance with the present disclosure may be implemented. FIG. 2~FIG. 9 illustrate examples of implementation of various proposed schemes in network environment 100 in accordance with the present disclosure. The following description of various proposed schemes is provided with reference to FIG. 1~FIG. 9.

Referring to FIG. 1, network environment 100 may involve at least a station (STA) 110 communicating wirelessly with a STA 120. Each of STA 110 and STA 120 may be a non-access point (non-AP) STA or, alternatively, either of STA 110 and STA 120 may function as an access point (AP) STA. In some cases, STA 110 and STA 120 may be associated with a basic service set (BSS) in accordance with one or more IEEE 802.11 standards (e.g., IEEE 802.11be and future-developed standards). Each of STA 110 and STA 120 may be configured to communicate with each other by utilizing the preamble designs for next-generation WLANs in the 60 GHz band in accordance with various proposed schemes described below. It is noteworthy that, while the various proposed schemes may be individually or separately described below, in actual implementations some or all of the proposed schemes may be utilized or otherwise implemented jointly. Of course, each of the proposed schemes may be utilized or otherwise implemented individually or separately.

It is noteworthy that, in IEEE 802.11ad, PPDU formats supported include those for DMG control mode (DMG_C_MODE), DMG single-carrier mode (DMG_SC_MODE), non-EDMG duplicated control mode (NON_EDMG_DUP_C_MODE) and non-EDMG duplicated single-carrier mode (NON_EDMG_DUP_SC_MODE). In IEEE 802.11ay, PPDU formats supported include those for EDMG control mode (EDMG_C_MODE), EDMG single-carrier mode (EDMG_SC_MODE) and EDMG orthogonal frequency-division multiplexing (OFDM) mode (EDMG_OFDM_MODE).

In the PPDU formats for IEEE 802.11ad DMG, the preamble may be a control physical-layer (C-PHY) preamble, single-carrier PHY (SC-PHY) preamble or OFDM PHY (OFDM-PHY) preamble, and a common preamble may be used for SC-PHY packets and OFDM-PHY packets. Moreover, the preamble may be used for packet detection, automatic gain control (AGC), carrier frequency offset (CFO) estimation, synchronization, indication of SC or OFDM mode, and channel estimation. Furthermore, in the header of a C-PHY packet in IEEE 802.11ad DMG, bits B22 and B23 are reserved bits, in the header of a SC-PHY packet in IEEE 802.11ad DMG, bits B44~B47 are reserved bits, and in the header of a OFDM-PHY packet in IEEE 802.11ad DMG, bits B46 and B47 are reserved bits.

In the PPDU formats for IEEE 802.11ay EDMG, there are typically several fields. These fields include an L-STF field, an L-CEF field, a legacy header (L-Header) field, an EDMG Header-A field, an EDMG-STF field, an EDMG-CEF field, an optional EDMG Header-B field, a Data field, and an optional truncation (TRN) field. The L-CEF field may be the same as that for SC mode in IEEE 802.11ad DMG, and the L-Header field may be the same as that for SC mode in IEEE 802.11ad DMG. Bit B46 in the L-Header field with a value of 1 may indicate existence of the EDMG Header-A field (e.g., in an EDMG PPDU). The EDMG Header-A field may be the same as that for SC and OFDM modes in IEEE 802.11ad DMG and may use SC mode transmission. The EDMG-CEF field may be different for SC and OFDM modes. In the SC mode, the EDMG-CEF field may not be present for bandwidth 2.16 GHz. The EDMG Header-B field may be only present for multi-user (MU) PPDU(s).

While transmission bandwidth in IEEE 802.11ad DMG may be up to 2.16 GHz, transmission bandwidth in IEEE 802.11ay EDMG may be 2.16 GHz, 4.32 GHz, 6.48 GHz, and up to 8.64 GHz. Thus, in cases where the transmission is 4.32 GHz, 6.48 GHz or 8.64 GHz, a 2.16 GHz subchannel may be duplicated multiple times over the transmission bandwidth (e.g., two times for 4.32 GHz, three times for 6.48 GHZ and four times for 8.64 GHz). Moreover, in IEEE 802.11ay EDMG transmissions, while the L-STF, L-CEF, L-Header and EDMG Header-A fields may be the same for SC and OFDM modes, the EDMG-STF, EDMG-CEF, Data and TRN fields may be different for SC and OFDM modes.

Figure 2:
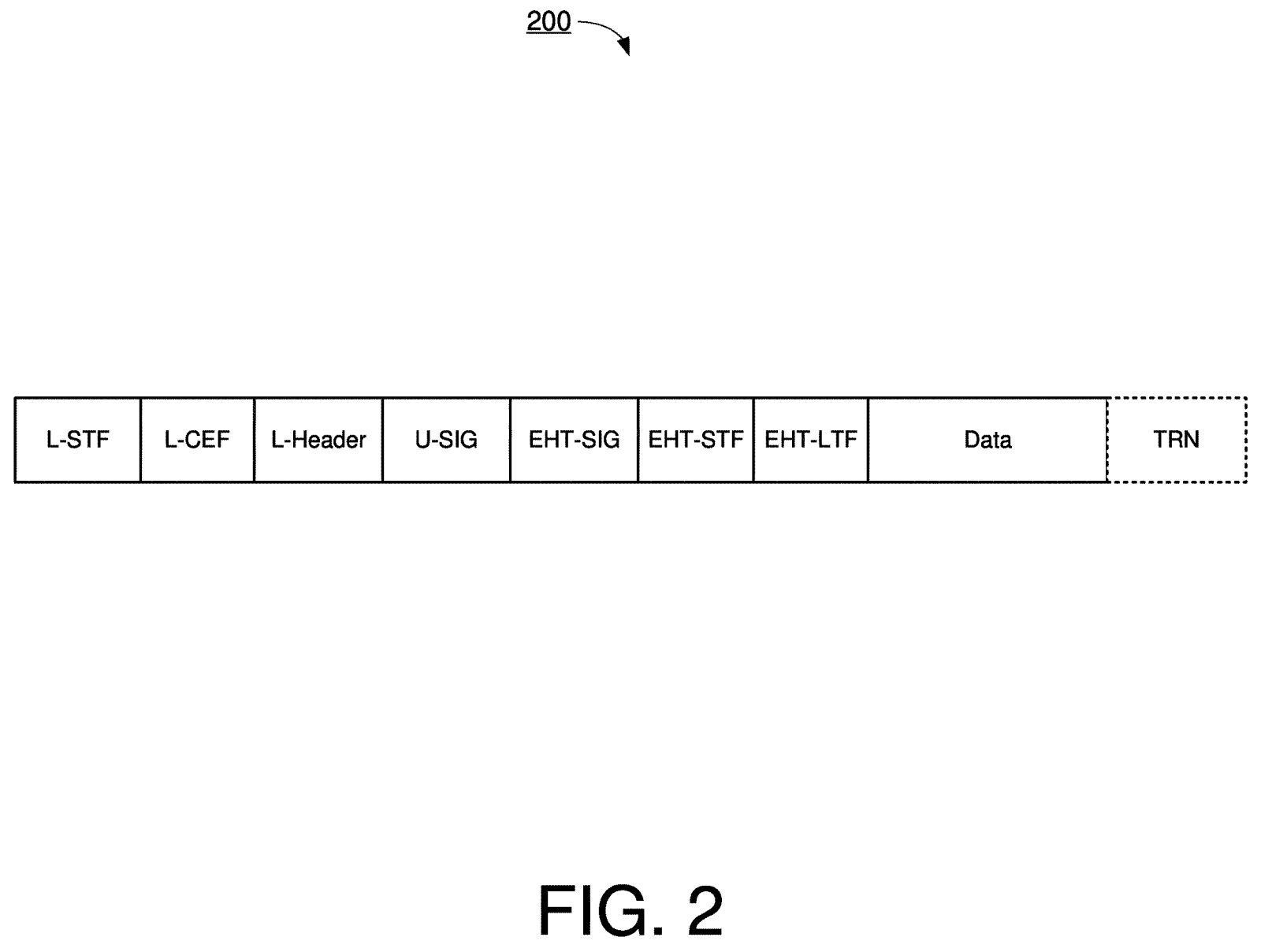

Under a first proposed scheme in accordance with the present disclosure regarding preamble designs for next-generation WLANs in the 60 GHz band with at least partial backward compatibility with some of the preexisting IEEE 802.11 standards, transmissions of the L-STF, L-CEF and L-Header fields may be kept the same as with transmissions in IEEE 802.11ad and/or IEEE 802.11ay. FIG. 2 illustrates an example design 200 under the first proposed scheme. Referring to FIG. 2, in design 200, a preamble for next-generation WLANs in the 60 GHz band may include the following fields: L-STF, L-CEF, L-Header, universal signaling (U-SIG) field, extremely-high-throughput (EHT) signaling (EHT-SIG) field, EHT short training field (EHT-STF), EHT long training field (EHT-LTF) and Data (and, optionally, TRN). The L-STF, L-CEF and L-Header fields may be the same as those in IEEE 802.11ad DMG, and transmission of the L-STF, L-CEF and L-Header fields may be in SC mode. These fields may serve for spoofing purpose to inform legacy STAs (e.g., STAs operating in accordance with IEEE 802.11ad and/or IEEE 802.11ay specifications) about the transmission of the preamble. In the L-Header field, bits B46 and B47 may be redefined (e.g., B46=0 and B47=1) to indicate that the U-SIG field is present. Moreover, a format of each of the U-SIG, EHT-SIG, EHT-STF, EHT-LTF and Data fields may be similar to those in IEEE 802.11be, except that subcarrier spacing (SCS) and bandwidth (to be redefined) of these fields may be different than corresponding fields in IEEE 802.11be. Transmission of the U-SIG, EHT-SIG, EHT-STF, EHT-LTF and Data fields may be in OFDM mode.

FIG. 3 illustrates an example design 300 under the first proposed scheme regarding situations in which the transmission bandwidth is greater than 2.16 GHz. Referring to FIG. 3, in design 300, a preamble for next-generation WLANs in the 60 GHz band may include the following fields: L-STF, L-CEF, L-Header, U-SIG, EHT-SIG, EHT-STF, EHT-LTF and Data (and, optionally, TRN). The L-STF, L-CEF and L-Header fields may be backward compatible with those in IEEE 802.11ad DMG and IEEE 802.11ay EDMG, and transmission of the L-STF, L-CEF and L-Header fields may be in SC mode. In design 300, the fields of L-STF, L-CEF, L-Header, U-SIG and EHT-SIG may be transmitted in one or more of multiple subchannels over a 2.16 GHz bandwidth, while the fields of EHT-STF, EHT-LTF, Data and TRN may be transmitted over the entirety of the 2.16 GHz bandwidth. Moreover, the U-SIG and EHT-SIG fields may have the same format as those in IEEE 802.11be and, in some cases, may be transmitted in OFDM mode. Furthermore, a format of each of the U-SIG, EHT-SIG, EHT-STF, EHT-LTF and Data fields may be similar to those in IEEE 802.11be, except that SCS and bandwidth (to be redefined) of these fields may be different than corresponding fields in IEEE 802.11be.

Under a second proposed scheme in accordance with the present disclosure regarding preamble designs for next-generation WLANs in the 60 GHz band with at least partial backward compatibility with some of the preexisting IEEE 802.11 standards, transmissions of the L-STF, L-CEF and L-Header fields may be kept the same as with transmissions in IEEE 802.11ad and/or IEEE 802.11ay. FIG. 4 illustrates example designs 400 under the second proposed scheme. Referring to part (A) of FIG. 4, a preamble for next-generation WLANs in the 60 GHz band may include the following fields: L-STF, L-CEF, L-Header, U-SIG, EHT-SIG, EHT-STF, EHT-LTF and Data (and, optionally, TRN). The L-STF, L-CEF and L-Header fields may be backward compatible with those in IEEE 802.11ad DMG and IEEE 802.11ay EDMG. Transmission of the L-STF, L-CEF and L-Header fields may be in a 2.16 GHz bandwidth. Moreover, a format of each of the EHT-STF, EHT-LTF and Data fields may be similar to those in IEEE 802.11be, except that SCS and bandwidth (to be redefined) of these fields may be different than corresponding fields in IEEE 802.11be. Transmissions of the U-SIG and EHT-SIG fields may be transmitted in one or more of multiple subchannels (e.g., each in 320 MHz bandwidth) over the 2.16 GHz bandwidth with a SCS=5 MHz and a number of fast Fourier transforms (Nfft)=64. The EHT-STF, EHT-LTF, Data and TRN fields may be transmitted in 1280 MHz PPDU(s).

Referring to part (B) of FIG. 4, a preamble for next-generation WLANs in the 60 GHz band may include the following fields: L-STF, L-CEF, L-Header, U-SIG, EHT-SIG, EHT-STF, EHT-LTF and Data (and, optionally, TRN). The L-STF, L-CEF and L-Header fields may be at least partially backward compatible with those in IEEE 802.11ad DMG and IEEE 802.11ay EDMG. Moreover, a format of each of the EHT-STF, EHT-LTF and Data fields may be similar to those in IEEE 802.11be, except that SCS and bandwidth (to be redefined) of these fields may be different than corresponding fields in IEEE 802.11be. Transmission of the L-STF, L-CEF and L-Header fields may be in a 1.08 GHz bandwidth. Transmissions of the U-SIG and EHT-SIG fields may be transmitted in one or more of multiple subchannels over the 1.08 GHz bandwidth. The EHT-STF, EHT-LTF, Data and TRN fields may be transmitted in 640 MHz PPDU(s).

Figure 5:
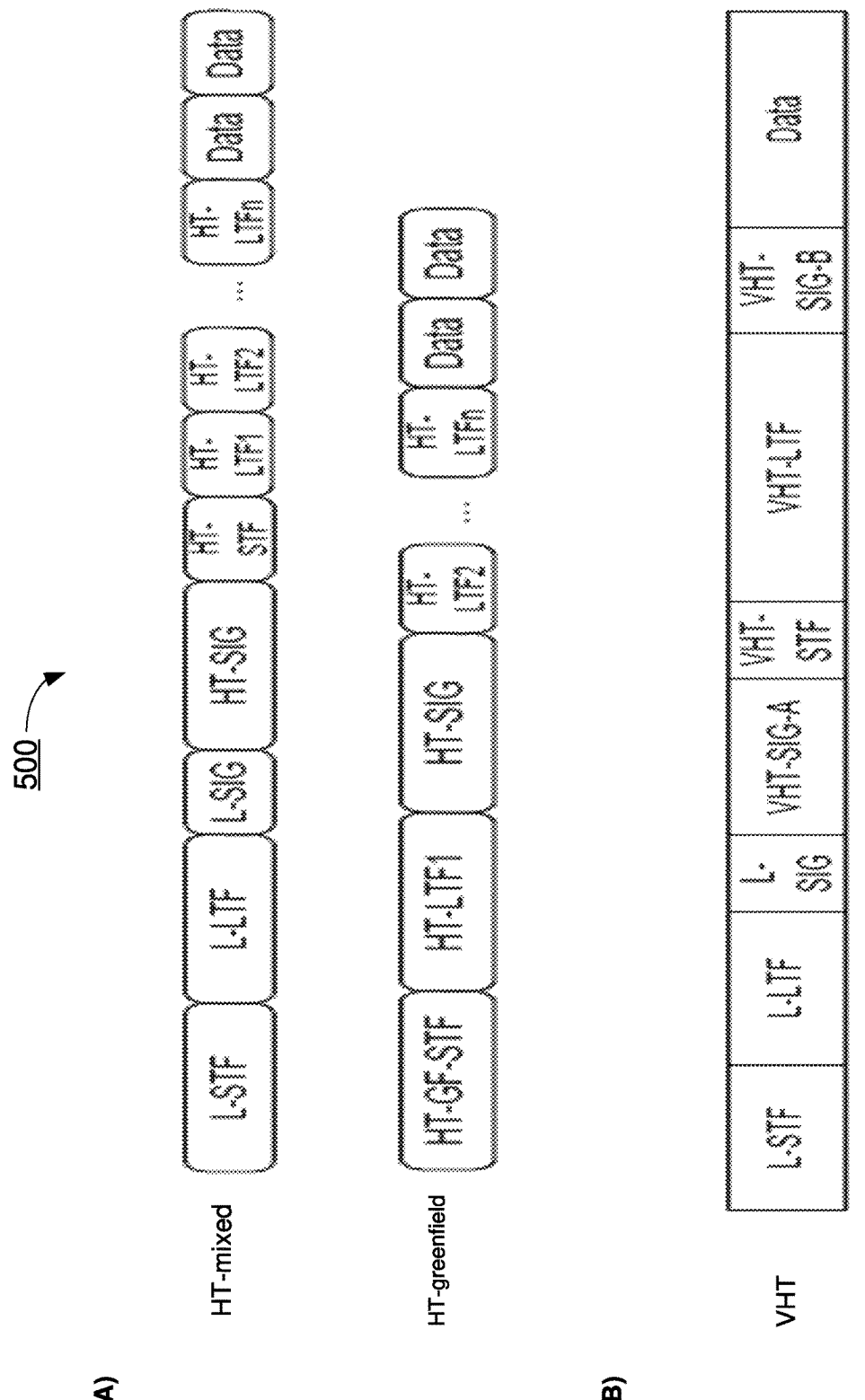
FIG. 5 is a diagram of example designs under a proposed scheme in accordance with the present disclosure.

Under a third proposed scheme in accordance with the present disclosure regarding preamble designs for next-generation WLANs in the 60 GHz band without backward compatibility with preexisting IEEE 802.11ad/ay standards, a preamble or PPDU format may reuse any of legacy IEEE 802.11n (high-throughput (HT)-mixed or HT-green field format), IEEE 802.11ac or IEEE 802.11ax/be format. FIG. 5 illustrates example designs 500 under the third proposed scheme. Under the proposed scheme, the IEEE 802.11n HT system PPDU format and preamble may be used in case that single-user multiple-input-multiple-output (SU-MIMO) transmission with a number of spatial streams ($N_{ss}$) up to 4 is supported, except that SCS and bandwidth (to be redefined) of these fields may be different than corresponding fields in IEEE 802.11n. Part (A) of FIG. 5 shows an example preamble in the HT-mixed format and another example preamble in the HT-greenfield format. Moreover, under the proposed scheme, the IEEE 80-2.11ac very-high-throughput (VHT) system PPDU format and preamble may be used in case that multi-user multiple-input-multiple-output (MU-MIMO) transmission on an entire operating bandwidth without orthogonal frequency-division multiple access (OFDMA) is supported, except that SCS and bandwidth (to be redefined) of these fields may be different than corresponding fields in IEEE 802.11ac. Part (B) of FIG. 5 shows an example preamble in the VHT format.

Figure 6:
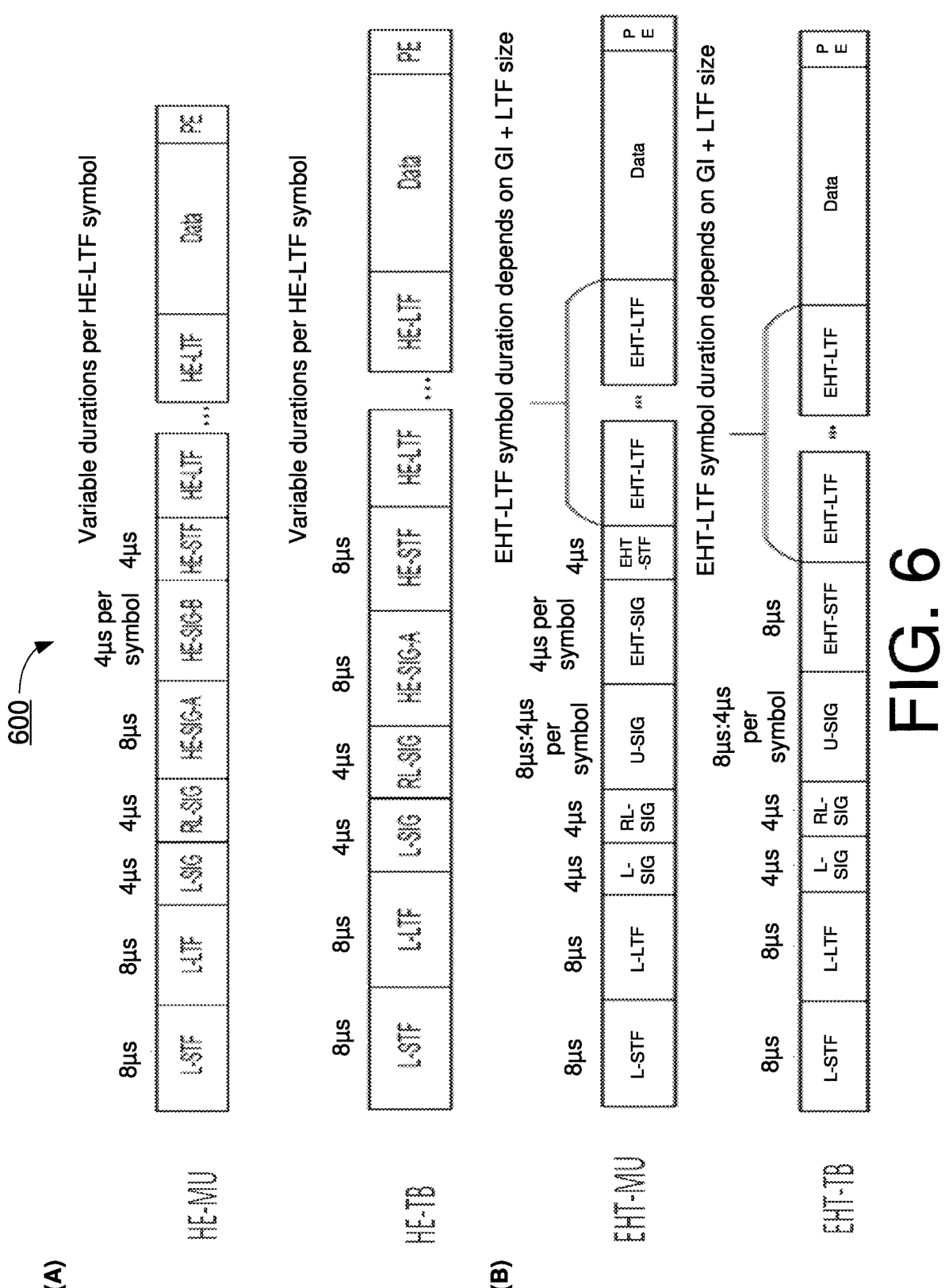
FIG. 6 is a diagram of example designs under a proposed scheme in accordance with the present disclosure.

FIG. 6 illustrates example designs 600 under the third proposed scheme. Under the proposed scheme, the IEEE 802.11ax PPDU format and preamble may be used in case that large RU-based OFDMA is supported, except that SCS and bandwidth (to be redefined) of these fields may be different than corresponding fields in IEEE 802.11ax. Part (A) of FIG. 6 shows an example preamble in the high-efficiency multi-user (HE-MU) format and high-efficiency transport block (HE-TB) format. Moreover, under the proposed scheme, the IEEE 802.11be PPDU format and preamble may be used in case that large RU and/or MRU-based OFDM is supported, except that SCS and bandwidth (to be redefined) of these fields may be different than corresponding fields in IEEE 802.11be. Part (B) of FIG. 6 shows an example preamble in the EHT multi-user (EHT-MU) format and another example preamble in the EHT transport block (EHT-TB) format.

Figure 7:
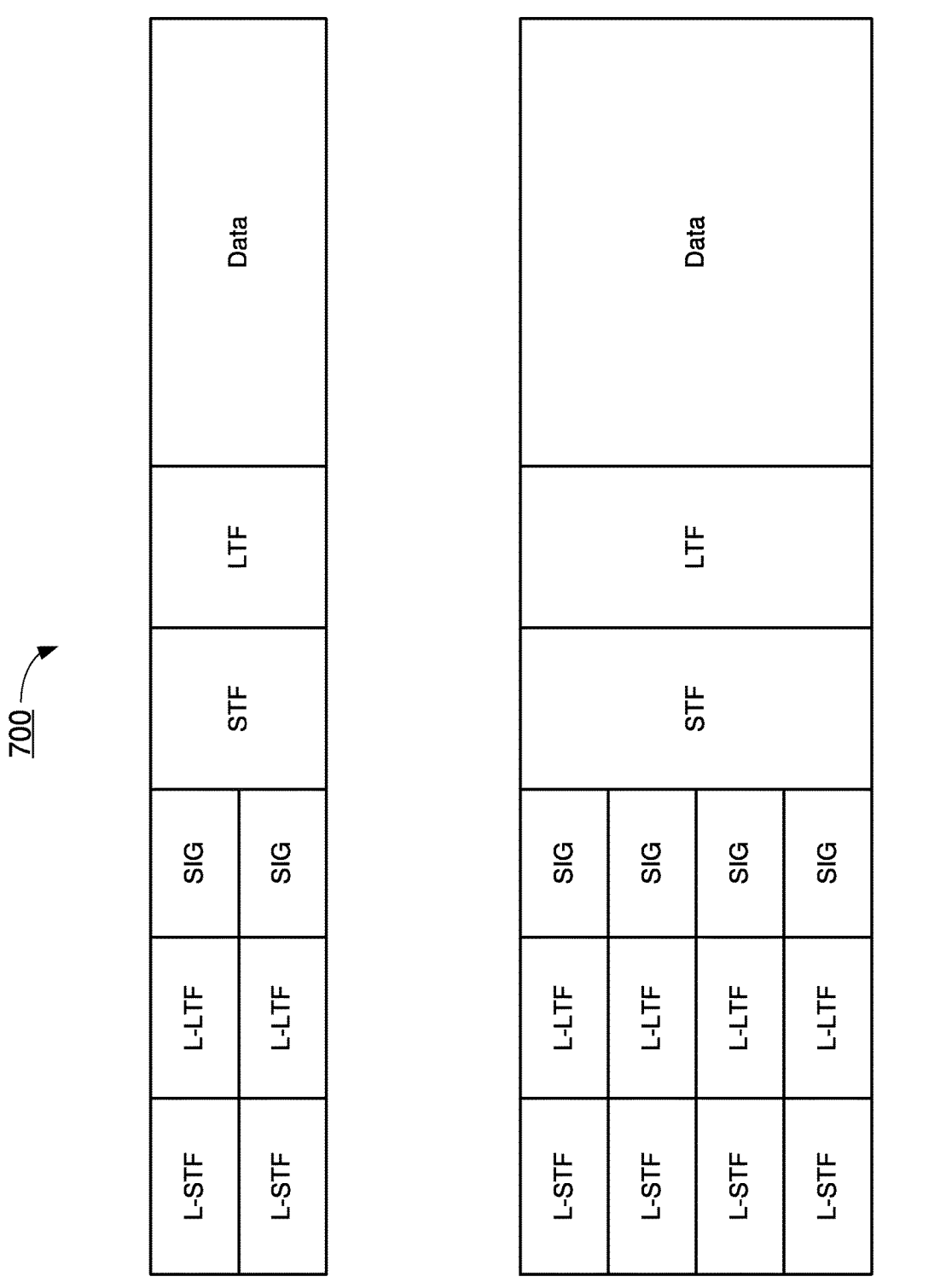
FIG. 7 is a diagram of example designs under a proposed scheme in accordance with the present disclosure.

Under a fourth proposed scheme in accordance with the present disclosure regarding preamble designs for next-generation WLANs in the 60 GHz band without backward compatibility with preexisting IEEE 802.11ad/ay standards, a minimum bandwidth in the 60 GHz band for next-generation WLANs may be 320 MHz (or other bandwidth(s) such as 80 MHz or 160 Mhz or 640 MHz or 1280 MHz). Under the fourth proposed scheme, in case that RU and/or MRU-based OFDMA is supported, the IEEE 802.11ax or IEEE 802.11be PPDU format and preamble may be used, except that SCS and bandwidth (to be redefined) of these fields may be different than corresponding fields in IEEE 802.11ax/be. FIG. 7 illustrates example designs 700 under the fourth proposed scheme. Under the proposed scheme, in case that the transmission channel bandwidth is 640 MHz, a legacy preamble (per 320 MHz) may be duplicated twice. Part (A) of FIG. 7 shows an example preamble in which the L-STF, L-LTF and SIG fields may be transmitted in each of two (duplicated) 320 MHz subchannels, while the STF, LTF and Data fields may be transmitted over the entire 640 MHz bandwidth. The SIG field may be a general signaling field and may include several symbols and some types of L-SIG, VHT-SIG, HE-SIG, U-SIG and so on. The L-STF, L-LTF and SIG fields may be transmitted with a SCS=5 MHz and Nfft=64. The STF, LTF and Data fields may be transmitted with a SCS=0.625 MHz, 1.25 MHz, 2.5 MHz or 5 MHz. Alternatively, under the proposed scheme, in case that the transmission channel bandwidth is 1280 MHz, the legacy preamble (per 320 MHz) may be duplicated four times. Part (B) of FIG. 7 shows an example preamble in which the L-STF, L-LTF and SIG fields may be transmitted in each of four (duplicated) 320 MHz subchannels, while the STF, LTF and Data fields may be transmitted over the entire 1280 MHz bandwidth. The SIG field may be a general signaling field and may include several symbols and some types of L-SIG, VHT-SIG, HE-SIG, U-SIG and so on. The L-STF, L-LTF and SIG fields may be transmitted with a SCS=5 MHz and Nfft=64. The STF, LTF and Data fields may be transmitted with a SCS=0.625 MHz, 1.25 MHz, 2.5 MHz or 5 MHz.

Illustrative Implementations

Figure 8:
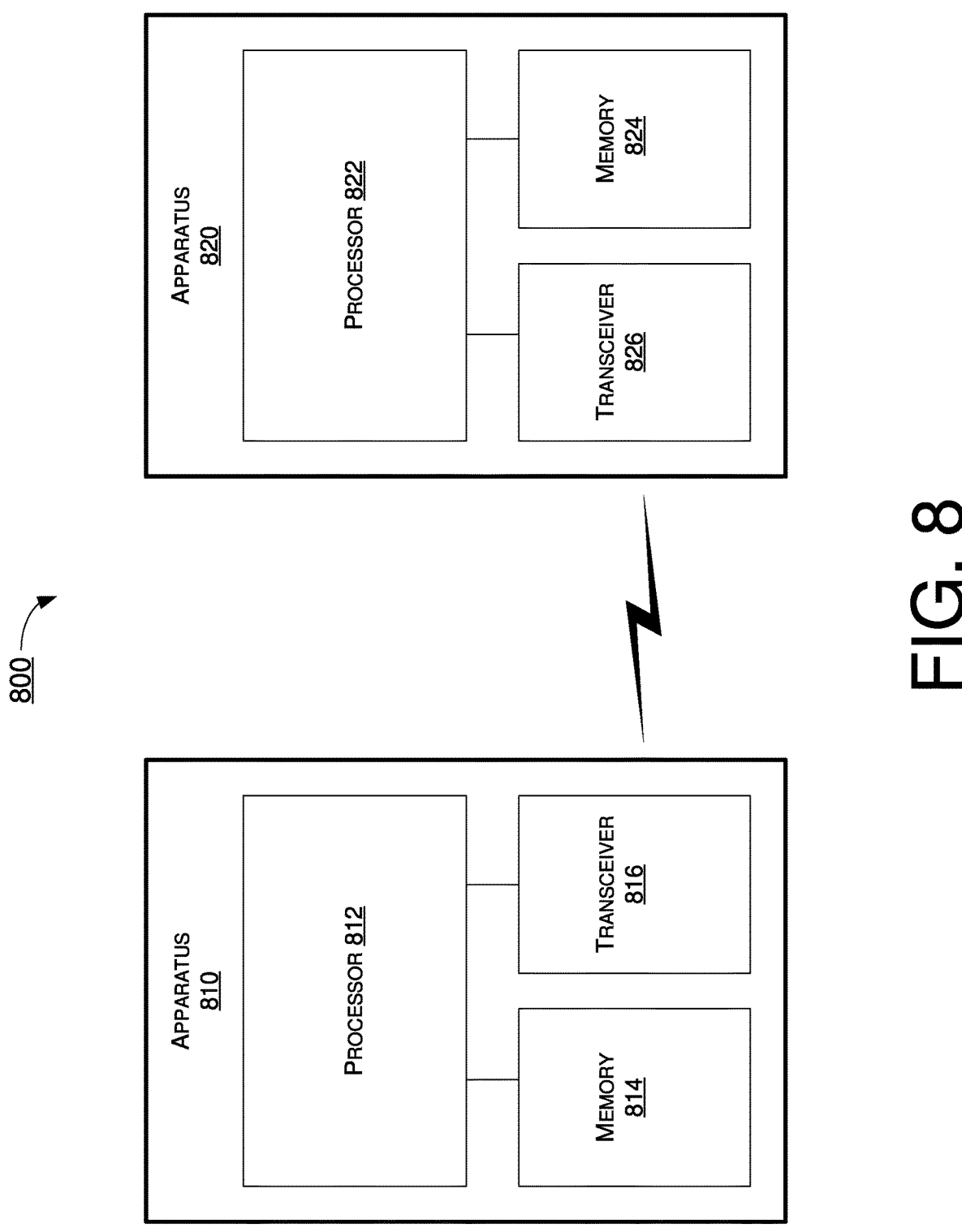
FIG. 8 is a block diagram of an example communication system in accordance with an implementation of the present disclosure.

FIG. 8 illustrates an example system 800 having at least an example apparatus 810 and an example apparatus 820 in accordance with an implementation of the present disclosure. Each of apparatus 810 and apparatus 820 may perform various functions to implement schemes, techniques, processes and methods described herein pertaining to preamble designs for next-generation WLANs in the 60 GHz band, including the various schemes described above with respect to various proposed designs, concepts, schemes, systems and methods described above as well as processes described below. For instance, apparatus 810 may be implemented in STA 110 and apparatus 820 may be implemented in STA 120, or vice versa.

Each of apparatus 810 and apparatus 820 may be a part of an electronic apparatus, which may be a non-AP STA or an AP STA, such as a portable or mobile apparatus, a wearable apparatus, a wireless communication apparatus or a computing apparatus. When implemented in a STA, each of apparatus 810 and apparatus 820 may be implemented in a smartphone, a smart watch, a personal digital assistant, a digital camera, or a computing equipment such as a tablet computer, a laptop computer or a notebook computer. Each of apparatus 810 and apparatus 820 may also be a part of a machine type apparatus, which may be an IoT apparatus such as an immobile or a stationary apparatus, a home apparatus, a wire communication apparatus or a computing apparatus. For instance, each of apparatus 810 and apparatus 820 may be implemented in a smart thermostat, a smart fridge, a smart door lock, a wireless speaker or a home control center. When implemented in or as a network apparatus, apparatus 810 and/or apparatus 820 may be implemented in a network node, such as an AP in a WLAN.

In some implementations, each of apparatus 810 and apparatus 820 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 810 and apparatus 820 may be implemented in or as a STA or an AP. Each of apparatus 810 and apparatus 820 may include at least some of those components shown in FIG. 8 such as a processor 812 and a processor 822, respectively, for example. Each of apparatus 810 and apparatus 820 may further include one or more other components not pertinent to the proposed scheme of the present disclosure (e.g., internal power supply, display device and/or user interface device), and, thus, such component(s) of apparatus 810 and apparatus 820 are neither shown in FIG. 8 nor described below in the interest of simplicity and brevity.

In one aspect, each of processor 812 and processor 822 may be implemented in the form of one or more single-core processors, one or more multi-core processors, one or more RISC processors or one or more CISC processors. That is, even though a singular term "a processor" is used herein to refer to processor 812 and processor 822, each of processor 812 and processor 822 may include multiple processors in some implementations and a single processor in other implementations in accordance with the present disclosure. In another aspect, each of processor 812 and processor 822 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 812 and processor 822 is a special-purpose machine specifically designed, arranged and configured to perform specific tasks including those pertaining to preamble designs for next-generation WLANs in the 60 GHz band in accordance with various implementations of the present disclosure.

In some implementations, apparatus 810 may also include a transceiver 816 coupled to processor 812. Transceiver 816 may include a transmitter capable of wirelessly transmitting and a receiver capable of wirelessly receiving data. In some implementations, apparatus 820 may also include a transceiver 826 coupled to processor 822. Transceiver 826 may include a transmitter capable of wirelessly transmitting and a receiver capable of wirelessly receiving data. It is noteworthy that, although transceiver 816 and transceiver 826 are illustrated as being external to and separate from processor 812 and processor 822, respectively, in some implementations, transceiver 816 may be an integral part of processor 812 as a system on chip (SoC), and transceiver 826 may be an integral part of processor 822 as a SoC.

In some implementations, apparatus 810 may further include a memory 814 coupled to processor 812 and capable of being accessed by processor 812 and storing data therein. In some implementations, apparatus 820 may further include a memory 824 coupled to processor 822 and capable of being accessed by processor 822 and storing data therein. Each of memory 814 and memory 824 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 814 and memory 824 may include a type of read-only memory (ROM) such as mask ROM, programmable ROM (PROM), erasable programmable ROM (EPROM) and/or electrically erasable programmable ROM (EEPROM). Alternatively, or additionally, each of memory 814 and memory 824 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 810 and apparatus 820 may be a communication entity capable of communicating with each other using various proposed schemes in accordance with the present disclosure. For illustrative purposes and without limitation, a description of capabilities of apparatus 810, as STA 110, and apparatus 820, as STA 120, is provided below. It is noteworthy that, although a detailed description of capabilities, functionalities and/or technical features of apparatus 820 is provided below, the same may be applied to apparatus 810 although a detailed description thereof is not provided solely in the interest of brevity. It is also noteworthy that, although the example implementations described below are provided in the context of WLAN, the same may be implemented in other types of networks.

Under various proposed schemes pertaining to preamble designs for next-generation WLANs in the 60 GHz band in accordance with the present disclosure, with apparatus 810 implemented in or as STA 110 and apparatus 820 implemented in or as STA 120 in network environment 100, processor 812 of apparatus 810 may communicate, via transceiver 816, in a 60 GHz band wirelessly with apparatus 820 by either or both: (i) transmitting a first PPDU to apparatus 820; and (ii) receiving a second PPDU from apparatus 820. Each of the first PPDU and the second PPDU and a respective preamble thereof may be either with or without at least partial backward compatibility with one or more preexisting PPDU formats and preambles.

In some implementations, each of the first PPDU and the second PPDU and the respective preamble thereof may be at least partially backward compatible with one or more pre-existing PPDU formats and preambles in accordance with either or both of IEEE 802.11ad and IEEE 802.11ay specifications. Moreover, each of the first PPDU and the second PPDU contains a plurality of fields comprising a L-STF, a L-CEF, a L-Header field, a U-SIG field, an EHT-SIG field, an EHT-STF, an EHT-LTF and a data field.

In some implementations, transmissions of the L-STF, L-CEF and L-Header field are in an SC mode and kept same as with transmissions in accordance with either or both of the IEEE 802.11ad and IEEE 802.11ay specifications. Moreover, bits B46 and B47 in the L-Header field may be set to indicate a presence of the U-SIG field.

In some implementations, a format of each of the U-SIG field, EHT-SIG field, EHT-STF, EHT-LTF and data field may be similar to that in accordance with IEEE 802.11be specifications but with a different subcarrier spacing and a different bandwidth. Moreover, the U-SIG field, EHT-SIG field, EHT-STF, EHT-LTF and data field may be transmitted in an orthogonal frequency-division multiplexing (OFDM) mode.

In some implementations, the EHT-STF and data field may be transmitted over an entirety of a transmission channel bandwidth without duplication. Furthermore, the L-STF, L-CEF, L-Header field, U-SIG field and EHT-SIG field may be transmitted in multiple subchannels duplicated over the entirety of the transmission channel bandwidth.

In some implementations, the L-STF, L-CEF, L-Header field, EHT-STF and data field may be transmitted over an entirety of a transmission channel bandwidth without duplication. Additionally, the U-SIG field and EHT-SIG field may be transmitted in multiple subchannels duplicated over the entirety of the transmission channel bandwidth.

In some implementations, each of the first PPDU and the second PPDU and the respective preamble thereof may be not backward compatible with one or more preexisting PPDU formats and preambles in accordance with either or both of IEEE 802.11ad and IEEE 802.11ay specifications. Moreover, either or both of a respective preamble and a PPDU format in accordance with IEEE 802.11n, IEEE 802.11ac, IEEE 802.11ax or IEEE 802.11be may be used for the preamble or PPDU format of each of the first PPDU and the second PPDU.

In some implementations, responsive to a SU-MIMO transmission with a number of spatial streams up to 4 being supported, the respective preamble and PPDU format in a HT system in accordance with the IEEE 802.11n specifications may be used for the preamble and PPDU format of each of the first PPDU and the second PPDU.

In some implementations, responsive to a MU-MIMO transmission over an entirety of a transmission channel bandwidth without OFDMA being supported, the respective preamble and PPDU format in a VHT system in accordance with the IEEE 802.11ac specifications may be used for the preamble and PPDU format of each of the first PPDU and the second PPDU.

In some implementations, responsive to a large RU-based transmission with OFDMA being supported, the respective preamble and PPDU format in accordance with the IEEE 802.11ax specifications may be used for the preamble and PPDU format of each of the first PPDU and the second PPDU.

In some implementations, responsive to a large RU or MRU-based transmission with OFDMA being supported, the respective preamble and PPDU format in accordance with the IEEE 802.11be specifications may be used for the preamble and PPDU format of each of the first PPDU and the second PPDU.

In some implementations, each of the first PPDU and the second PPDU may contain a plurality of fields comprising a L-STF, a L-LTF, a SIG field, a STF, a LTF and a data field. In such cases, responsive to a transmission channel bandwidth being greater than 80 MHz or 160 MHz or 320 MHz, the STF, LTF and data field may be transmitted over an entirety of a transmission channel bandwidth without duplication while the L-STF, L-LTF and SIG field may be transmitted in multiple 320 MHz subchannels duplicated over the entirety of the transmission channel bandwidth.

Illustrative Processes

FIG. 9 illustrates an example process 900 in accordance with an implementation of the present disclosure. Process 900 may represent an aspect of implementing various proposed designs, concepts, schemes, systems and methods described above. More specifically, process 900 may represent an aspect of the proposed concepts and schemes pertaining to preamble designs for next-generation WLANs in the 60 GHz band in accordance with the present disclosure. Process 900 may include one or more operations, actions, or functions as illustrated by one or more of block 910 as well as subblocks 912 and 914. Although illustrated as discrete blocks, various blocks of process 900 may be divided into additional blocks, combined into fewer blocks, or eliminated, depending on the desired implementation. Moreover, the blocks/sub-blocks of process 900 may be executed in the order shown in FIG. 9 or, alternatively in a different order. Furthermore, one or more of the blocks/sub-blocks of process 900 may be executed repeatedly or iteratively. Process 900 may be implemented by or in apparatus 810 and apparatus 820 as well as any variations thereof. Solely for illustrative purposes and without limiting the scope, process 900 is described below in the context of apparatus 810 implemented in or as STA 110 functioning as a non-AP STA and apparatus 820 implemented in or as STA 120 functioning as an AP STA of a wireless network such as a WLAN in network environment 100 in accordance with one or more of IEEE 802.11 standards. Process 900 may begin at block 910.

At 910, process 900 may involve processor 812 of apparatus 810 communicating, via transceiver 816, in a 60 GHz band wirelessly with apparatus 820. Each of the first PPDU and the second PPDU and a respective preamble thereof may be either with or without at least partial backward compatibility with one or more preexisting PPDU formats and preambles. Communications between apparatus 810 and apparatus 820 may be represented by 912 and 914.

At 912, process 900 may involve processor 812 transmitting a first PPDU to apparatus 820.

At 914, process 900 may involve processor 812 receiving a second PPDU from apparatus 820.

In some implementations, each of the first PPDU and the second PPDU and the respective preamble thereof may be at least partially backward compatible with one or more preexisting PPDU formats and preambles in accordance with either or both of IEEE 802.11ad and IEEE 802.11ay specifications. Moreover, each of the first PPDU and the second PPDU contains a plurality of fields comprising a L-STF, a L-CEF, a L-Header field, a U-SIG field, an EHT-SIG field, an EHT-STF, an EHT-LTF and a data field.

In some implementations, transmissions of the L-STF, L-CEF and L-Header field are in an SC mode and kept same as with transmissions in accordance with either or both of the IEEE 802.11ad and IEEE 802.11ay specifications. Moreover, bits B46 and B47 in the L-Header field may be set to indicate a presence of the U-SIG field.

In some implementations, a format of each of the U-SIG field, EHT-SIG field, EHT-STF, EHT-LTF and data field may be similar to that in accordance with IEEE 802.11be specifications but with a different subcarrier spacing and a different bandwidth. Moreover, the U-SIG field, EHT-SIG field, EHT-STF, EHT-LTF and data field may be transmitted in an orthogonal frequency-division multiplexing (OFDM) mode.

In some implementations, the EHT-STF and data field may be transmitted over an entirety of a transmission channel bandwidth without duplication. Furthermore, the L-STF, L-CEF, L-Header field, U-SIG field and EHT-SIG field may be transmitted in multiple subchannels duplicated over the entirety of the transmission channel bandwidth.

In some implementations, the L-STF, L-CEF, L-Header field, EHT-STF and data field may be transmitted over an entirety of a transmission channel bandwidth without duplication. Additionally, the U-SIG field and EHT-SIG field may be transmitted in multiple subchannels duplicated over the entirety of the transmission channel bandwidth.

In some implementations, each of the first PPDU and the second PPDU and the respective preamble thereof may be not backward compatible with one or more preexisting PPDU formats and preambles in accordance with either or both of IEEE 802.11ad and IEEE 802.11ay specifications. Moreover, either or both of a respective preamble and a PPDU format in accordance with IEEE 802.11n, IEEE 802.11ac, IEEE 802.11ax or IEEE 802.11be may be used for the preamble or PPDU format of each of the first PPDU and the second PPDU.

In some implementations, responsive to a SU-MIMO transmission with a number of spatial streams up to 4 being supported, the respective preamble and PPDU format in a HT system in accordance with the IEEE 802.11n specifications may be used for the preamble and PPDU format of each of the first PPDU and the second PPDU.

In some implementations, responsive to a MU-MIMO transmission over an entirety of a transmission channel bandwidth without OFDMA being supported, the respective preamble and PPDU format in a VHT system in accordance with the IEEE 802.11ac specifications may be used for the preamble and PPDU format of each of the first PPDU and the second PPDU.

In some implementations, responsive to a large RU-based transmission with OFDMA being supported, the respective preamble and PPDU format in accordance with the IEEE 802.11ax specifications may be used for the preamble and PPDU format of each of the first PPDU and the second PPDU.

In some implementations, responsive to a large RU or MRU-based transmission with OFDMA being supported, the respective preamble and PPDU format in accordance with the IEEE 802.11be specifications may be used for the preamble and PPDU format of each of the first PPDU and the second PPDU.

In some implementations, each of the first PPDU and the second PPDU may contain a plurality of fields comprising a L-STF, a L-LTF, a SIG field, a STF, a LTF and a data field. In such cases, responsive to a transmission channel bandwidth being greater than 80 MHz or 160 MHz or 320 MHz, the STF, LTF and data field may be transmitted over an entirety of a transmission channel bandwidth without duplication while the L-STF, L-LTF and SIG field may be transmitted in multiple 320 MHz subchannels duplicated over the entirety of the transmission channel bandwidth.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
communicating, by a processor of a first apparatus, in a 60 GHz band wirelessly with a second apparatus by:
transmitting a first physical-layer protocol data unit (PPDU) to the second apparatus; and
receiving a second PPDU from the second apparatus,
wherein at least one of the first PPDU and the second PPDU and a respective preamble thereof is with at least partial backward compatibility with one or more pre-existing PPDU formats and preambles,
wherein the at least one of the first PPDU and the second PPDU contains a plurality of fields comprising a legacy short training field (L-STF), a legacy channel estimation field (L-CEF), a legacy header (L-Header) field, a universal signaling (U-SIG) field, an extremely-high-throughput (EHT) signaling (EHT-SIG) field, an EHT short training field (EHT-STF), an EHT long training field (EHT-LTF) and a data field,
wherein the at least one of the first PPDU and the second PPDU is transmitted or received with:
the EHT-STF and the EHT-LTF transmitted over an entirety of an operating bandwidth, and
at least the U-SIG field and the EHT-SIG field duplicated in multiple subchannels over the operating bandwidth, and
wherein at least two bits in the L-Header are set to indicate a presence of a U-SIG field, and wherein the U-SIG field, duplicated in multiple subchannels of the operating bandwidth, is transmitted prior to the EHT-STF in the at least one of the first PPDU and the second PPDU.

2. The method of claim 1, wherein the at least one of the first PPDU and the second PPDU and the respective preamble thereof is at least partially backward compatible with one or more preexisting PPDU formats and preambles in accordance with either or both of Institute of Electrical and Electronics Engineers (IEEE) 802.11ad and IEEE 802.11ay specifications.

3. The method of claim 2, wherein transmissions of the L-STF, L-CEF and L-Header field are in a single-carrier (SC) mode and kept same as with transmissions in accordance with either or both of the IEEE 802.11ad and IEEE 802.11ay specifications, and wherein bits B46 and B47 in the L-Header field are set to indicate a presence of the U-SIG field.

4. The method of claim 3, wherein a format of each of the U-SIG field, EHT-SIG field, EHT-STF, EHT-LTF and data field is similar to that in accordance with IEEE 802.11be specifications but with a different subcarrier spacing and a different bandwidth, and wherein the U-SIG field, EHT-SIG field, EHT-STF, EHT-LTF and data field are transmitted in an orthogonal frequency-division multiplexing (OFDM) mode.

5. The method of claim 3, wherein the EHT-STF and data field are transmitted over an entirety of a transmission channel bandwidth without duplication, and wherein the L-STF, L-CEF, L-Header field, U-SIG field and EHT-SIG field are transmitted in multiple subchannels duplicated over the entirety of the transmission channel bandwidth.

6. The method of claim 3, wherein the L-STF, L-CEF, L-Header field, EHT-STF and data field are transmitted over an entirety of a transmission channel bandwidth without duplication, and wherein the U-SIG field and EHT-SIG field are transmitted in multiple subchannels duplicated over the entirety of the transmission channel bandwidth.

7. The method of claim 1, wherein one of the first PPDU and the second PPDU and the respective preamble thereof is not backward compatible with one or more preexisting PPDU formats and preambles in accordance with either or both of Institute of Electrical and Electronics Engineers (IEEE) 802.11ad and IEEE 802.11ay specifications, and wherein either or both of a respective preamble and a PPDU format in accordance with Institute of Electrical and Electronics Engineers (IEEE) 802.11n, IEEE 802.11ac, IEEE 802.11ax or IEEE 802.11be are used for the preamble or PPDU format of the one of the first PPDU and the second PPDU.

8. The method of claim 7, wherein, responsive to a single-user multiple-input-multiple-output (SU-MIMO) transmission with a number of spatial streams up to 4 being supported, the respective preamble and PPDU format in a high-throughput (HT) system in accordance with the IEEE 802.11n specifications are used for the preamble and PPDU format of the one of the first PPDU and the second PPDU.

9. The method of claim 7, wherein, responsive to a multi-user multiple-input-multiple-output (MU-MIMO) transmission over an entirety of a transmission channel bandwidth without orthogonal frequency-divisional multiple access (OFDMA) being supported, the respective preamble and PPDU format in a very-high- throughput (VHT) system in accordance with the IEEE 802.11ac specifications are used for the preamble and PPDU format of the one of the first PPDU and the second PPDU.

10. The method of claim 7, wherein, responsive to a large resource unit (RU)-based transmission with orthogonal frequency-divisional multiple access (OFDMA) being supported, the respective preamble and PPDU format in accordance with the IEEE 802.11ax specifications are used for the preamble and PPDU format of the one of the first PPDU and the second PPDU.

11. The method of claim 7, wherein, responsive to a large resource unit (RU) or multi-resource unit (MRU)-based transmission with orthogonal frequency-divisional multiple access (OFDMA) being supported, the respective preamble and PPDU format in accordance with the IEEE 802.11be specifications are used for the preamble and PPDU format of the one of the first PPDU and the second PPDU.

12. The method of claim 7, wherein the one of the first PPDU and the second PPDU contains a plurality of fields comprising a legacy short training field (L-STF), a legacy long training field (L-LTF), a signaling (SIG) field, a short training field (STF), a long training field (LTF) and a data field, and wherein, responsive to a transmission channel bandwidth being greater than 80 MHz or 160 MHz or 320 MHz, the STF, LTF and data field are transmitted over an entirety of a transmission channel bandwidth without duplication while the L-STF, L-LTF and SIG field are transmitted in multiple 320 MHz subchannels duplicated over the entirety of the transmission channel bandwidth.

13. An apparatus, comprising:
a transceiver configured to communicate wirelessly; and
a processor coupled to the transceiver and configured to perform operations comprising:
  communicating, by a processor of a first apparatus, in a 60 GHz band wirelessly with a second apparatus by:
    transmitting a first physical-layer protocol data unit (PPDU) to the second apparatus; and
    receiving a second PPDU from the second apparatus,
  wherein at least one of the first PPDU and the second PPDU and a respective preamble thereof is with at least partial backward compatibility with one or more pre-existing PPDU formats and preambles,
  wherein the at least one of the first PPDU and the second PPDU contains a plurality of fields comprising a legacy short training field (L-STF), a legacy channel estima-tion field (L-CEF), a legacy header (L-Header) field, a universal signaling (U-SIG) field, an extremely-high-throughput (EHT) signaling (EHT-SIG) field, an EHT short training field (EHT-STF), an EHT long training field (EHT-LTF) and a data field,
  wherein the at least one of the first PPDU and the second PPDU is transmitted or received with:
    the EHT-STF and the EHT-LTF transmitted over an entirety of an operating bandwidth, and
    at least the U-SIG field and the EHT-SIG field dupli-cated in multiple subchannels over the operating bandwidth, and
  wherein at least two bits in the L-Header are set to indicate a presence of a U-SIG field, and wherein the U-SIG field, duplicated in multiple subchannels of the operating bandwidth, is transmitted prior to the EHT-STF in the at least one of the first PPDU and the second PPDU.

14. The apparatus of claim 13, wherein the at least one of the first PPDU and the second PPDU and the respective preamble thereof is at least partially backward compatible with one or more preexisting PPDU formats and preambles in accordance with either or both of Institute of Electrical and Electronics Engineers (IEEE) 802.11ad and IEEE 802.11ay specifications.

15. The apparatus of claim 13, wherein one of the first PPDU and the second PPDU and the respective preamble thereof is not backward compatible with one or more preexisting PPDU formats and preambles in accordance with either or both of Institute of Electrical and Electronics Engineers (IEEE) 802.11ad and IEEE 802.11ay specifica-tions, and wherein either or both of a respective preamble and a PPDU format in accordance with Institute of Electrical and Electronics Engineers (IEEE) 802.11n, IEEE 802.11ac, IEEE 802.11ax or IEEE 802.11be are used for the preamble or PPDU format of the one of the first PPDU and the second PPDU.

16. The apparatus of claim 15, wherein, responsive to a single-user multiple-input-multiple-output (SU-MIMO) transmission with a number of spatial streams up to 4 being supported, the respective preamble and PPDU format in a high-throughput (HT) system in accordance with the IEEE 802.11n specifications are used for the preamble and PPDU format of the one of the first PPDU and the second PPDU.

17. The apparatus of claim 15, wherein, responsive to a multi-user multiple-input-multiple-output (MU-MIMO) transmission over an entirety of a transmission channel bandwidth without orthogonal frequency-divisional multiple access (OFDMA) being supported, the respective preamble and PPDU format in a very-high-throughput (VHT) system in accordance with the IEEE 802.11ac specifications are used for the preamble and PPDU format of the one of the first PPDU and the second PPDU.

18. The apparatus of claim 15, wherein, responsive to a large resource unit (RU)-based transmission with orthogonal frequency-divisional multiple access (OFDMA) being supported, the respective preamble and PPDU format in accordance with the IEEE 802.11ax specifications are used for the preamble and PPDU format of the one of the first PPDU and the second PPDU.

19. The apparatus of claim 15, wherein, responsive to a large resource unit (RU) or multi-resource unit (MRU)-based transmission with orthogonal frequency-divisional multiple access (OFDMA) being supported, the respective preamble and PPDU format in accordance with the IEEE 802.11be specifications are used for the preamble and PPDU format of the one of the first PPDU and the second PPDU.

20. The apparatus of claim 15, wherein the one of the first PPDU and the second PPDU contains a plurality of fields comprising a legacy short training field (L-STF), a legacy long training field (L-LTF), a signaling (SIG) field, a short training field (STF), a long training field (LTF) and a data field, and wherein, responsive to a transmission channel bandwidth being greater than 80 MHz or 160 MHz or 320 MHz, the STF, LTF and data field are transmitted over an entirety of a transmission channel bandwidth without duplication while the L-STF, L-LTF and SIG field are transmitted in multiple 320 MHz subchannels duplicated over the entirety of the transmission channel bandwidth.

\* \* \* \* \*